No. 769,069. PATENTED AUG. 30, 1904.
J. H. W. FITZGERALD.
TIRE FOR VEHICLES.
APPLICATION FILED APR. 25, 1903.
NO MODEL.

Witnesses:
Edw. S. Duvall, Jr.
Chas. W. Cunningham.

Inventor
John H. W. Fitzgerald,
By R. S. & C. Caldwell, Attys.

No. 769,069. Patented August 30, 1904.

UNITED STATES PATENT OFFICE.

JOHN HERBERT WILSON FITZGERALD, OF BEDFORD PARK, ENGLAND.

TIRE FOR VEHICLES.

SPECIFICATION forming part of Letters Patent No. 769,069, dated August 30, 1904.

Application filed April 25, 1903. Serial No. 154,302. (No model.)

*To all whom it may concern:*

Be it known that I, JOHN HERBERT WILSON FITZGERALD, a subject of the King of Great Britain and Ireland, residing at 37 Fairfax road, Bedford Park, county of Middlesex, England, have invented certain new and useful Improvements in or Relating to Tires for Vehicles, of which the following is a specification.

My invention relates to certain improvements in tires for automobile and like vehicles in which the propelling force is applied directly from the axle to the periphery of the wheel or wheels.

The object of the said invention is to prevent what is generally known as "skidding" or "side slip," which obtains when such vehicle has to turn within a limited radius and at other times in ordinary road locomotion. Since said "slip" is due to a coating of greasy nature upon the substratum of the road, it is evident that a tractive grip must be obtained independently of the surface and touching the solid surface underlying it.

My invention consists, essentially, in the production of two forms of non-skidding tires especially applicable to automobile vehicles—viz., one in which the tire is first manufactured with this object in view and the other in which the improvements according to my invention may be adapted to existing tires.

In order that my invention may be clearly understood, I have appended the accompanying sheet of drawings, in which—

Figure 1:
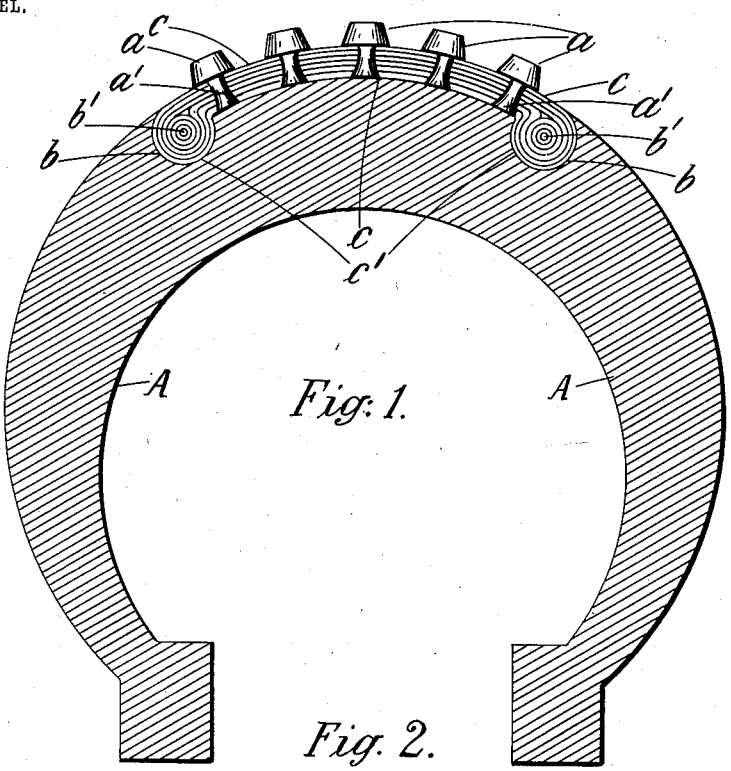
Figure 2:
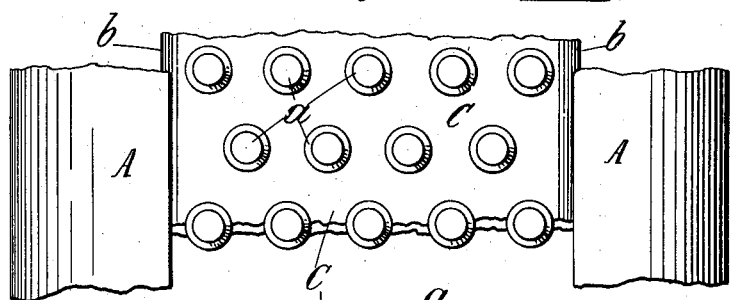
Figure 3:
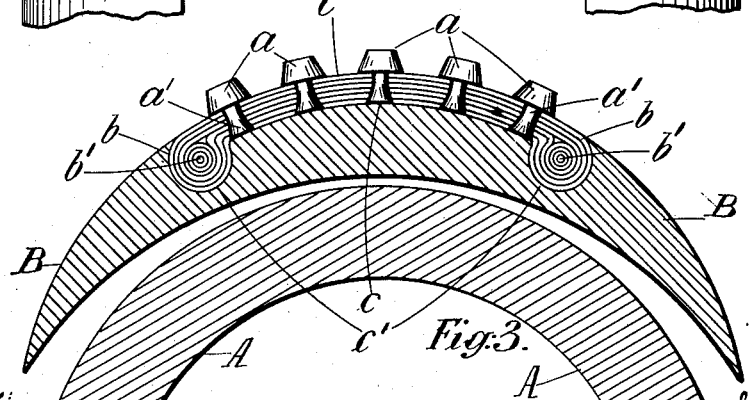

Figure 1 is a transverse section of a tire especially manufactured throughout. Fig. 2 is a part plan view thereof. Fig. 3 is a transverse section of the arrangement whereby the invention may be applied to an existing tire.

Similar letters of reference indicate corresponding parts throughout the views.

I use an ordinary pneumatic or inflated tire A with a central groove $c$ or two side grooves $c'$ at the tread or tractive surface sunk sufficiently to receive an endless inextensible flexible band C, carrying projecting studs $a$, either pyramidal, conical, or other suitable shape, which are preferably of suitable metal. Said band C may be (but not necessarily) of slightly-less internal diameter than that of the bottom of the sunk recess $c$ or recesses $c'$ in the tire A, to which it is fitted, and is constructed of any suitable unpuncturable material, substance, or composition—such, for instance, as layers of canvas or similar fabric—vulcanized and pressed or otherwise treated, so as to be coherent and that the whole shall possess the minimum degree of elasticity, especially at the enlarged edges $b$, with sufficient tenacity to hold the shanks $a'$ of the projecting studs $a$, which may be riveted, secured by sunk nuts, or in any desirable manner through the thickness of said flexible endless inextensible band C. The edges $c'$ of the circumferential groove or recess $c$ in the tread of the tire A are dovetailed, undercut, or otherwise shaped to engage with the enlarged edges $b$ of C, the inextensibility of the edges $b$ being maintained by the introduction of a core $b'$ of fabric or other suitable inextensible or non-stretchable material. When the tire A is deflated, the band C is readily placed in position or removed and tightly held by its shape in relation to the shape of the inflated tire and by the rigidity of the tire when inflated and rendered incapable of lateral movement, while the "creeping" incidental to two surfaces in contact in some cases is reduced to a minimum by reason of the maintenance of a tight contact with the circumferential and edge surfaces of the groove or recess. A slight creeping is essential for the double purpose of reducing the wear and tear of the studs $a$ and also to provide an intermediate surface contact between the road and the tire proper. The flexibility of the band C, due to its construction, prevents it from impairing the resiliency of the tire A.

In adapting my improved form of tread to existing tires I employ a grooved or molded seating B, forming a ring circumferentially around the periphery of the tire, Fig. 3, cemented, vulcanized, or otherwise suitably attached to the periphery of the ordinary tire A and provided with a groove or recess $c$ and recesses $c'$, in which the band C may be fitted, as in the instance hereinbefore described and shown by Fig. 1. The band C may have a layer of soft rubber or equivalent on its outer surface, in which the studs $a$ are partly embedded, so as to partly fill the spaces therebetween, and in some cases it may be desirable for light forms of tires—as, for instance, for use with motor-cycles—to employ the studded band C without the thickened edges b and corresponding sunk side recesses c', the band C with or without the groove c adapting itself to the tire-tread.

The tires constructed according to my invention and to which the same is adapted are not only non-skidding, but are practically puncture-proof at the point of contact with the road, thus prolonging the life of such tires and possessing the additional advantage of being manipulated by an unskilled person.

Having now described my invention, what I claim as new, and desire to secure by Letters Patent, is—

In a tire for vehicles, the tire-body formed in its periphery with a channeled seat having groove enlargements at its edges, a flexible laminated band fitted in said seat and having enlarged edge portions engaging said groove enlargements, and cores extending through the enlarged edge portions of the band.

In testimony whereof I have affixed my signature in presence of two witnesses.

JOHN HERBERT WILSON FITZGERALD.

Witnesses:
 BENJN. THOS. KING,
 ROBT. HUNTER.